United States Patent [19]

Lorenz et al.

[11] Patent Number: 5,261,266
[45] Date of Patent: Nov. 16, 1993

[54] SENSOR TIP FOR A ROBOTIC GRIPPER AND METHOD OF MANUFACTURE

[75] Inventors: Robert D. Lorenz; Gregory T. Jackson, both of Madison, Wis.

[73] Assignee: Wisconsin Alumni Research Foundation, Madison, Wis.

[21] Appl. No.: 849,660

[22] Filed: Mar. 10, 1992

Related U.S. Application Data

[62] Division of Ser. No. 640,638, Jan. 14, 1991, abandoned, which is a division of Ser. No. 469,381, Jan. 24, 1990, Pat. No. 5,010,773.

[51] Int. Cl.⁵ ............................................. G01L 25/00
[52] U.S. Cl. ..................................................... 73/1 B
[58] Field of Search ........................ 73/1 B, 1 C, 865.7

[56] References Cited

U.S. PATENT DOCUMENTS

| | | |
|---|---|---|
| 4,099,409 | 7/1978 | Edmond . |
| 4,264,549 | 4/1981 | Utner ............................... 264/272.15 |
| 4,328,441 | 5/1982 | Kroeger, Jr. et al. . |
| 4,414,984 | 11/1983 | Zarudiansky . |
| 4,478,089 | 10/1984 | Aviles et al. . |
| 4,526,043 | 7/1985 | Boie et al. . |
| 4,555,954 | 12/1985 | Kim . |
| 4,566,845 | 1/1986 | Al Mouhamed et al. . |
| 4,620,436 | 11/1986 | Hirabayashi et al. .................. 73/1 B |
| 4,640,137 | 2/1987 | Trull et al. . |
| 4,658,233 | 4/1987 | Uchida . |
| 4,686,073 | 4/1987 | Koller ............................. 264/272.15 |
| 4,694,231 | 9/1987 | Alvite . |
| 4,715,235 | 12/1987 | Fukai et al. . |
| 4,745,812 | 5/1988 | Amazeen et al. . |
| 4,817,440 | 4/1989 | Curtin . |
| 4,821,589 | 4/1989 | Lembke . |
| 4,823,618 | 4/1989 | Ramming . |
| 4,964,302 | 10/1990 | Grahn et al. ....................... 73/865.7 |
| 4,982,611 | 1/1991 | Lorenz et al. . |
| 5,089,979 | 2/1992 | McEachern et al. .................. 73/1 B |

FOREIGN PATENT DOCUMENTS

| | | |
|---|---|---|
| 0120040 | 6/1986 | Japan ................................. 73/1 B |
| 0109344 | 5/1988 | Japan ................................. 73/1 B |
| 0217241 | 9/1988 | Japan ............................... 73/865.7 |
| 755552 | 8/1980 | U.S.S.R. . |
| 1232475 | 5/1986 | U.S.S.R. . |
| 1271743 | 11/1986 | U.S.S.R. . |

OTHER PUBLICATIONS

Sears et al., "University Physics", Addison-Wesley Publishing Co., Reading Mass., 1976, pp. 541, 542, 537–539.

D. M. Van De Reit, "Experimental Evaluation in the Development of a Multi-Degree-Of-Freedom Tactile (List continued on next page.)

Primary Examiner—Robert Raevis
Attorney, Agent, or Firm—Foley & Lardner

[57] ABSTRACT

A sensor tip (10) for use in a robotic hand has a three-dimensional compliant elastomeric body (12) with an outer boundary (22) having a circular base (24) and a convex surface (26) extending therefrom. Four strain transducers (14, 16, 18, and 20) produce electrical signals indicative of the strain at various positions near the boundary of the elastomeric body (12) resulting from forces exerted upon the sensor tip (10) by an object which the robotic hand is manipulating. The transducers (14, 16, 18, and 20) are positioned about the convex surface (26) so as to produce signals that may be decoupled to determine the normal and tangential forces and the applied torque. A buffer amplifier circuit (34), one for each of the transducers (14, 16, 18, and 20), receives the signals and provides quasi-steady state force information. The circuit (34) connects the respective transducer (40) in a feedback loop around an amplifier (36) and has desirable attributes for static charge buffering. The sensor tip (10) is calibrated to determine proportionality constants for the decoupling algorithm for use of a force delivering system (60), which uses voice coils (74) to apply a force that is linearly related to the current introduced to each of the coils (74). A method of manufacture of the sensor tip (10) results in improved bonding between the transducers (14, 16, 18, and 20) and the elastomeric body (12) for better performance and longer life of the sensor tip (10).

8 Claims, 9 Drawing Sheets

OTHER PUBLICATIONS

Sensor", a report submitted in partial fulfillment of the requirements for the degree of MS Manf'g Sys. Eng. @the Univ. of Wisconsin–Madison.

P. Dario, et al., "An Anthropomorphic Robot Finger for Investigating Artificial Tactile Perception," The International Journal of Robotics Research, vol. 6, No. 3, Fall 1987, pp. 25–48.

R. Bardelli, et al., "Piezo-and Pyroelectric Polymers Skin-Like Tactile Sensors for Robots and Prostheses," 13th International Symposium on Industrial Robot Technology, vol. 2, pp. 18–45 to 18–56. The exact publication date is unclear but prior to May 1987.

R. Bajcsy, "What Can We Learn From One Finger Experiments," Robotics Research, Brady & Paul, editors, pp. 509–527. Published prior to May 1987.

A. F. Davis, et al., "Corrugated PVDF Bimorphs as Tactile Sensors and Micro-actuators—A Research Note," Robotica, vo. 1, pp. 239–240, 1984.

S. Hackwood, et al., "Torque-Sensitive Tactile Array for Robotics," 3rd Conference on Robotic Vision and Sensory Control, 1983, pp. 602–607.

L. D. Harmon, "A Sense of Touch Begins to Gather Momentum," Sensor Review, vol. 2, Apr. 1981, pp. 82–88.

W. D. Hillis, "Active Touch Sensing," A. I. Memo 629, Massachusetts Institute of Technology Artificial Intelligence Laboratory, 1981.

E. Keller, "Piezoelectric Substances, Strain Gages, and Other Sensors Give Robots a Feel for the Job," Electronics, vol. 56, No. 23, Nov. 17, 1983, pp. 119–121.

E. Kolm, et al., "How Piezoelectric Devices Earn Their Keep", Chemtech, vol. 13, 1983, pp. 180–186.

D. H. Mott, et al., "An Experimental Very High Resolution Tactile Sensor Array," Proceedings of the 4th International Conference on Robot Vision and Sensory Controls, pp. 241–250. Published prior to May 1987.

T. J. Nelson, et al., "Shear-Sensitive Magnetoresistive Robotic Tactile Sensor," Preprint dated Mar. 12, 1986.

J. A. Purbrick, "A Force Transducer Employing Conductive Silicone Rubber," Proceedings of the 1st International Conference on Robot Vision and Sensory Controls, Apr. 1–3, 1981, pp. 73–80.

M. H. Raibert, et al., "Design and Implementation of a VLSI Tactile Sensing Computer," The International Journal of Robotics Research, vol. 1, No. 3, 1982, pp. 3–18.

J. Rebman, et al., "A Tactile Sensor with Electrooptical Transduction," Proceedings of the 3rd International Conference on Robot Vision and Sensory Controls, 1983, pp. 210–214.

R. N. Stauffer, "Progress in Tactile Sensor Development," Robotics Today, vol. 5, No. 3, Jun. 1983, pp. 43–45.

W. E. Snyder, et al., "Conductive Elastomers as Sensor for Industrial Parts Handling," IEEE Transactions on Instrumentation and Measurements, vol. IM-27, No. 1, Mar. 1978, pp. 94–99.

J. Severwright, "Tactile Sensor Arrays: The Other Option," Sensor Review, Jan. 1983, pp. 27–29.

B. E. Robertson, et al., "Tactile Sensor System for Robotics," 12th International Symposium on Industrial Robotics, pp. 572–577, published prior to May 1987.

K. Tanie, et al., "A High Resolution Tactile Sensor," Proceedings of the 4th International Conference on Robot Vision and Sensory, Controls, pp. 251–260, published prior to May 1987.

J. M. Vranish, "Magnetoresistive Skin for Robots," Proceedings of the 4th International Conference on Robot Vision and Sensory Controls, pp. 269–284, published prior to May 1987.

"Sensors for Intelligent Robots," in Robot Control, pp. 220–230.

U.S. patent application Ser. No. 07/198,193, by Robert D. Lorenz and Douglas Van de Riet, entitled "Multiple-Degree-of-Freedom Sensor Timp for a Robotic Gripper," filed May 24, 1988 with the U.S. Patent and Trademark Office.

Douglas Mark Van De Reit, "Experimental Evaluation in the Development of a Multi-Degree-Of-Freedom Tactile Sensor," a report submitted in partial fulfillment of the requirements for the degree of Master of Science, Manufacturing Systems Engineering at the University of Wisconsin–Madison, May 1987.

R. D. Lorenz, K. M. Meyer, D. M. Van De Riet, "A Novel, Complaint, Four Degree-Of-Freedom, Robotic Fingertip Sensor," Paper presented in oral form at the Fall 1988 IEEE Industrial Applications Society Annual Meeting and accepted for future publication in the Industrial Applications Society (IAS) Transactions.

SENSOR TIP FOR A ROBOTIC GRIPPER AND METHOD OF MANUFACTURE

This invention was made with U.S. Government support awarded by the NASA, Grant #: NAGW-975. The U.S. Government has certain rights in this invention.

This is a division of application Ser. No. 07/640,638 filed Jan. 14, 1991, abandoned, which is a division of Ser. No. 07/469,381, filed Jan. 24, 1990, now U.S. Pat. No. 5,010,773.

FIELD OF THE INVENTION

This invention relates generally to robotics, and particularly to tactile sensors for use in robotic grippers where force feedback information is needed.

BACKGROUND OF THE INVENTION

Robots are increasingly being employed in tasks that are otherwise dangerous or tedious to humans. The utility of a robot can be increased when tactile sensors are incorporated into the hands or grippers of the robot to enable the robot to "feel" objects in its environment. Ideally, a robotic hand should be able to hold an object tight enough to keep the object from slipping from its grasp, yet be gentle enough not to crush or break the object. One method of accomplishing these objectives is by an elastomeric, three-dimensional sensor tip such as is disclosed in U.S. patent application Ser. No. 07/198,193 filed May 24, 1988, U.S. Pat. No. 4,982,611, and which is incorporated herein by reference. The sensor tip includes transducers that are positioned in selected positions and orientations about the surface of the sensor tip and are preferably composed of a piezoelectric polymer film having lead wires attached. The wires carry the electrical signals that correspond to the deformation or strain experienced by the elastomeric body. The signals are amplified by a signal amplifier, and then are provided to a hard wired processing circuit or a computer which decouples the electrical signals into the individual force components.

In a simple measurement scheme, the electrical signal from the piezoelectric polymer film of a particular transducer created by a step in force may be measured directly by an oscilloscope with a typical 10 megohm $(10 \times 10^6 \, \Omega)$ input impedance. The capacitance of the piezoelectric polymer film is typically approximately 200 pf $(200 \times 10^{-12} \, f)$. The voltage appearing across the piezoelectric polymer film will then be drained off through the oscilloscope as a first order decay according to the time constant, $\tau$, where $\tau$ equals the resistance (R) multiplied by the capacitance (C). In such a case $\tau = (10 \times 10^6) \times (200 \times 10^{-12}) = 0.002$ seconds. Force information lasting 0.002 seconds is of little use in a system which is intended to grasp and hold objects to perform useful work. Consider, for example, the grasp by a robot of a bolt that is to be inserted into a threaded hole. The grasp may be required for as long as 10-15 seconds. If the force information is to have less than 5% drift over that period, then, assuming a first order decay, the time constant of the system must be 200 seconds. To provide usable information, therefore, a means for providing quasi-steady state force information without substantial signal drift and without compromising measurement sensitivity is necessary.

The decoupling of the individual force components acting upon the sensor tip is readily accomplished in that the ouputs of the transducers may be related to the forces by various linear and non-linear decoupling algorithms. To provide for proper decoupling, it is necessary to calibrate the sensor tip using known force levels to calculate the constants used in the decoupling algorithm. A force delivery system adequate for calibration must therefore be able to deliver pure forces while simultaneously recording the sensor output. Force delivery systems involving weights and pulleys do not allow good accuracy or repeatability and the use of pulleys introduces high levels of friction. Such force delivery systems are clearly inadequate for testing and calibration of sensor tips with industrial application.

In the repeated use of a sensor tip as described above, it has been found that the piezoelectric polymer film may delaminate from the surface of the outer boundary of the sensor tip. Though the sensor tips are inexpensive and readily consumable, the performance and lifetime of the sensor tip can be improved if such delamination can be prevented.

SUMMARY OF THE INVENTION

The three-dimensional sensor tip in accordance with the present invention is capable of being contacted from three orthogonal directions and of providing signals indicative of the force and/or torque components acting upon the sensor tip at the point of contact. The sensor tip has an elastomeric body preferably shaped to have a circular base and a convex surface extending therefrom. Four transducers that convert strain in the body to output voltage are placed about the convex surface and provide electrical output signals which may be combined to produce signals corresponding to the force and torque components acting at the point of contact. A buffer amplifier circuit is connected to the transducers to provide signals with insignificant decay for most situations. Further, the simplicity of the buffer amplifier circuit lends itself to miniaturization to allow the circuit to be attached directly to the base of the sensor tip.

As a method of force delivery for purposes of testing and calibration of the sensor tips, the present invention employs drivers having a voice coil suspended within a magnetic field from a permanent magnet that produces a force linear with the current introduced to the coil. The present system allows a quick mount and dismount of the sensors, provides precise delivery of individual force components to the sensor tip, and yields repeatable measurements.

The preferred transducer is a piezoelectric polymer film with a silver ink coating. Such a coating has desirable bonding characteristics with the silicone rubber of which the elastomeric body is typically formed. The manufacturing process of the sensor tip is further improved in that it is a multiple stage, multiple material process. The manufacturing process in accordance with the present invention is a routine procedure yielding a reliable product. The materials and sequences utilized provide superior bonding between the piezoelectric polymer film and the elastomeric body. Delamination of the piezoelectric polymer film from the elastomeric body is greatly reduced.

Further objects, features, and advantages of the invention will be apparent from the following detailed description taken in conjunction with the accompanying drawings.

DETAILED DESCRIPTION OF THE INVENTION

Figure 1:
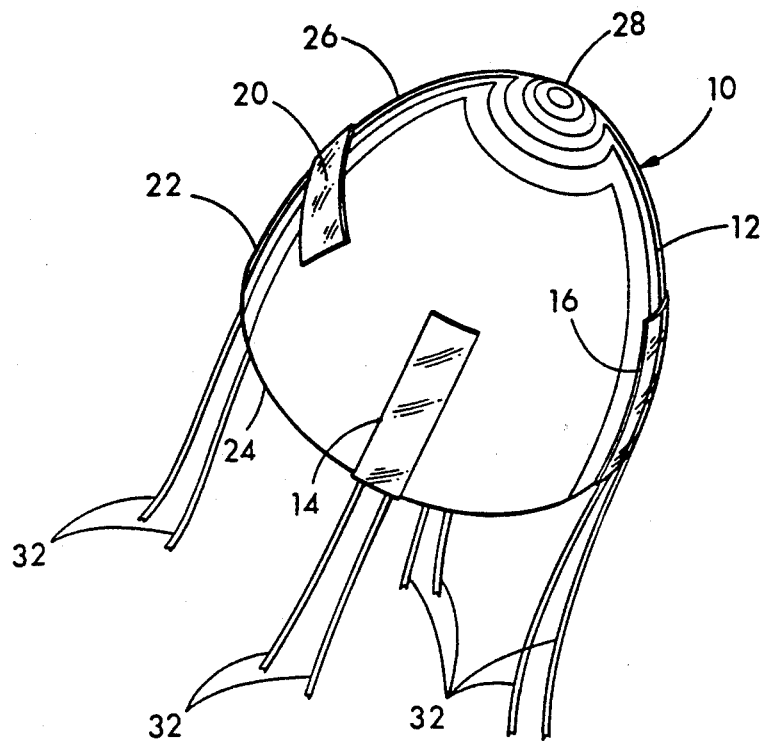
FIG. 1 is a perspective view of the sensor tip of the present invention.
Figure 2:
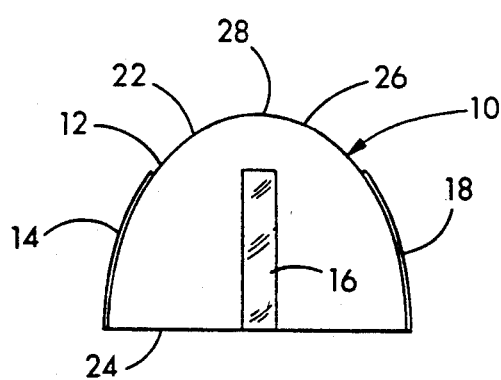
FIG. 2 is a side plan view of the sensor tip.
Figure 3:
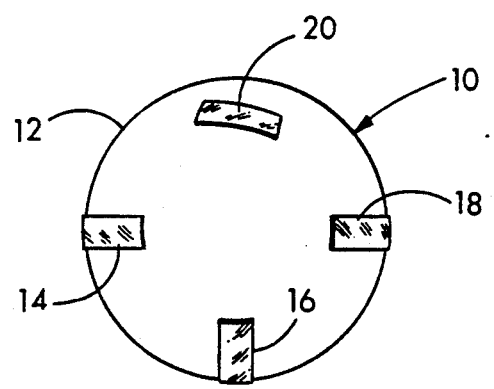
FIG. 3 is a top plan view of the sensor tip.

With reference to the drawings, a preferred embodiment of a sensor tip constructed in accordance with the invention is shown generally at 10 in FIGS. 1, 2, and 3. The sensor tip 10 is adapted for use in a robotic hand capable of grasping and manipulating an object and provides feedback information on forces acting upon the sensor tip 10 by the object. The elements of the preferred sensor tip 10 include an elastomeric body 12 and four transducers 14, 16, 18, and 20. The elastomeric body 12 is preferably approximately as compliant as human flesh and may be, for example, approximately the size of a male adult thumb. The body 12 has a 3-dimensional outer boundary 22 so that the body 12 is capable of being contacted from three orthogonal directions. The outer boundary 22 is preferably shaped to have a circular base 24 and a convex surface 26 extending therefrom. The convex surface 26 has a distal point 28 of maximal distance from the base 24. The four transducers 14, 16, 18, and 20 are positioned near the base 24 along, or preferably slightly submerged beneath, the outer boundary 22. The transducers 14, 16, 18, and 20 are positioned about the periphery of the convex surface 26 in pre-selected locations and orientations with modest precision requirements. The transducers 14, 16, 18, and 20 produce electrical signals indicative of strain in the elastomeric body 12. The strain in the elastomeric body 12 results from the forces acting upon the body 12 by the object which the robotic hand is manipulating.

The material for the elastomeric body should have consistent mechanical properties, low hysteresis, retention of its resilient properties even under large deformation, and should not deteriorate when exposed to sunlight or common industrial chemicals. Silicone rubber is an example of a preferred material which generally meets these requirements. Silicone rubber is isotropic because of its molecular structure, and it has a constant Young's modulus over a broad temperature and deformation range with unique linearity compared with other elastomers. Silicone rubber will maintain its flexibility almost indefinitely at moderately elevated temperatures. It has a very good resistance to outdoor weathering and to low concentrations of acids, bases, and salts. A preferred silicone rubber is room temperature vulcanized, has a Shore Hardness rating in the range of 45–55, has a relatively short curing time, and is flowable in its uncured state so that the silicone rubber can be poured into a mold. Suitable commercially available silicone rubbers include Dow Chemical RTV 3110, Dow Sylgard 184, General Electric RTV 161, and General Electric RTV 162. Silicone rubber in the prescribed hardness range is stiff enough to be durable, yet possesses enough compliance for adaptive grasping for most purposes. In general, the material of the body 12 should be at least as compliant as, and preferably more compliant than the object being grasped by the robotic hand.

The outer boundary 22 of the elastomeric body 12 is Preferably rounded to a convex surface 26 because sharp corners produce inconsistent load distributions, stress concentrations, and other irregularities. The convex surface 26 of the outer boundary 22 is preferably shaped as a portion of an ellipsoid, the body 12 forming one-half of the ellipsoid as taken along its major axis. It has been found that the sensitivity of the transducers 14, 16, 18, and 20 improve as the slope of the outer boundary 22 of the body 12 at the base 24 becomes closer to a perpendicular to the base. Hence, a configuration which is half of an ellipsoid is generally preferred over other configurations, such as a paraboloid. In order to optimize both the signal output from the transducers 14, 16, 18, and 20, and the mechanical characteristics of the body 12, the ratio of the major axis to the minor axis of the ellipsoid is preferably about 1.6. With respect to signal production from the force transducers 14, 16, 18, and 20, the sensor tip 10 should produce signals of the greatest amplitude for a given force that acts upon the sensor tip 10. A short, stout, elastomeric body is not desirable in that it will not produce large signals when subjected to either normal or tangential forces. However, an elastomeric body which is excessively tall and thin is easily broken and subject to deflections which can lead to large non-linearities. It has been found that the body 12 is preferably formed in a range where the ratio between the major axis and the minor axis of the ellipsoid is between 1.0 (hemispherical) and 2.0. The lower end of the range has more difficulties in signal propagation, especially in a direction normal to the body 12, whereas the higher end of the range has more mechanical problems. As noted above, the optimal ratio of the major axis to the minor axis is 1.6. This equates to a ratio of 0.8 when the ratio is taken of the maximal distance between the base 24 and distal point 28 with respect to the diameter of the base 24. Similarly, the range of ratios between the major axis and minor axis of the ellipsoid of between 1.0 and 2.0 as specified above, equates to a range of 0.5 to 1.0 when the ratio is taken of the maximal distance between the base 24 and the distal point 28 with respect to the diameter of the base 24.

In the optimization of the sensor tip shape, an additional consideration is the proportionality of the amplitudes of signal outputs of the transducers 14, 16, 18, and 20 to the actual magnitude of the force components applied, referred to herein as the sensitivity ratio. For example, the tangential forces will generally be about one-sixth the magnitude of the normal forces based upon the friction coefficients of rubber (the elastomeric body 12) and steel (a common material for an object manipulated by a robot). An optimal sensitivity ratio is 1/6 where the sensitivity ratio is defined as the ratio of the signal output due to normal forces to that produced by a tangential force of the same magnitude. Good results are obtained with an ellipsoid having a 1.6 ratio (major axis to minor axis), resulting in a sensitivity ratio of 0.16.

The transducers 14, 16, 18, and 20 convert displacement of the elastomeric body 12, i.e. strain, into an electrical output. Suitable preferred transducers are strips of piezoelectric polymer film that convert strain to voltage. The piezoelectric polymer film is preferably composed of polyvinylidene fluoride (PVDF or $PVF_2$), a material which is not brittle, has high piezoelectric sensitivity, and can be formed into desired shapes. Suitable PVDF film is commercially available from the Penwalt Corporation of King of Prussia, Pa. under the trademark KYNAR. The PVDF film preferably has a silver ink surface (Pennwalt descriptor: AgInk) in that such a surface is highly conductive and provides a suitable substrate for the adhesives used in the attachment of wire leads, discussed below. The PVDF can be manufactured quite thin, and since it has a fairly low modulus of elasticity, it is easily strained and will not materially affect the mechanical properties of a soft substrate, such as the elastomeric body 12. The piezoelectric film is anisotropic and this is considered a desirable attribute of the film in that it allows greater independence of signals between transducers 14, 16, 18, and 20 in response to applied loads. For transducers 14, 16, and 18, the orientation of the anisotropism should be directed generally from the distal point 28 toward the periphery of the base 24. For the transducer 20, the orientation of the anisotropism should preferably be directed helically about the convex surface 26.

A suitable thickness of the polymer film of the transducers 14, 16, 18, and 20 is 28 microns, though other thicknesses may also be operable with the present invention. The thickness of the above-described piezoelectric film, however, generally has no influence on the signal response. A suitable size for the polymer strips is 0.5 inch×0.25 inch on a sensor tip having a 1.6 elliptical ratio and which is approximately 1.0 inch from the base 24 to the distal point 28. Though large pieces of film produce a desirable, stronger signal, this must be weighed against potential difficulties with delamination of the film from the body 12 due to the increase in shear with a larger or thicker film. Smaller pieces of film should be used in high load applications because the shorter pieces stay bonded to the rubber under high stresses better than longer pieces of piezoelectric film. The bonding of the transducers 14, 16, 18, and 20 to the body 12 at the convex surface 26 is discussed further below.

Figure 4:
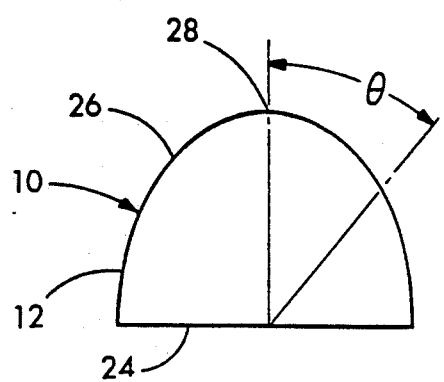
FIG. 4 is a simplified side view of the sensor tip, showing the possible locations of the center of the piezoelectric polymer film transducers along the convex surface of the elastomeric body on an angle $\theta$, the angle being taken from a line normal to the base.

The position of the transducers 14, 16, 18, and 20 on the concave surface 26 is also important to an optimization of both the signal magnitude and for the ideal sensitivity ratio. Near the base 24 of the sensor, it has been found that the strain is dominated by bending, while at the distal point 28 of the sensor tip 10 the compression forces on the surface of the rubber as created by the tangential force applied in shear is dominant. In order to obtain the desired sensitivity ratio of 1:6, experiments have shown that the film should be positioned such that the angle $\theta$ is 70° from the center of the film to a line normal to the base 24 through the distal point 28, as depicted in FIG. 4.

Figure 6:
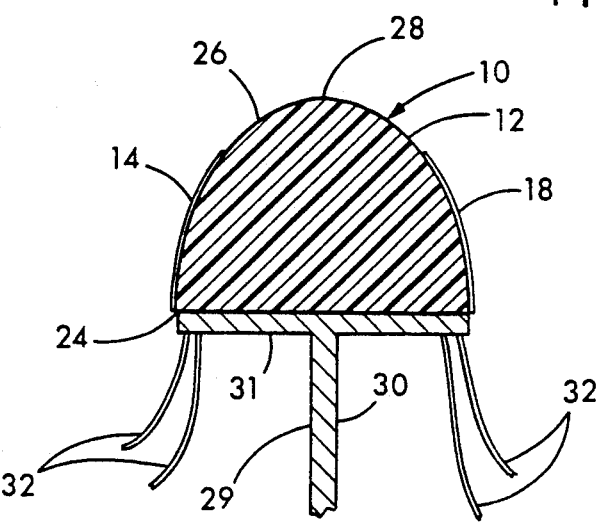
FIG. 6 is a cross-section through the sensor tip showing the sensor tip attached to a finger member.

The sensor tip 10 would typically form part of a finger for a robotic hand, gripper, probe, or the like. An example of such a configuration is shown in FIG. 6. The robot finger of FIG. 6 includes a finger support member 29 having a shaft 30 and a flat support plate 31 mounted to the top of the shaft. The support member 29 is preferably made of a strong structural material, such as steel. The base 24 of the tip 10 is glued or otherwise firmly affixed to the top of the plate 31 which has openings through which lead wires 32 pass.

Figure 7:
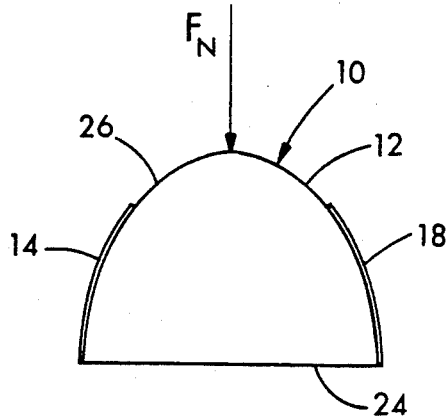
FIG. 7 is an illustrative view of a normal force acting upon the sensor tip.
Figure 8:
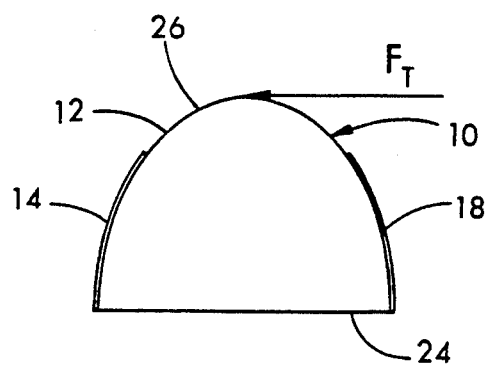
FIG. 8 is an illustrative view of a tangential force acting upon the sensor tip.

Having a three-dimensional outer boundary 22, the sensor tip 10 is capable of experiencing force components from three orthogonal directions (a normal force and two tangential forces), as well as a torque acting around an axis extending normal to the base 24 and through the distal point 28. The transducers 14, 16, 18, and 20 are placed around the circular base 24 at separated positions to enable the determination of the independent (orthogonal) force and torque components from the output signals produced by the transducers. When a force is applied to the sensor tip 10, the elastomeric body 12 deforms, causing the piezoelectric transducers to be strained and emit electric signals directly related to the strain. As an example of the forces acting upon the sensor tip 10, the two-dimensional example of FIGS. 7 and 8 may be considered. The sensor tip 10 of FIG. 7 is shown experiencing a purely normal force, causing compression in both transducers 14 and 18. If a change occurs in the normal force applied to the sensor tip 10, a corresponding and proportional change in the signals from the transducers 14 and 18 will result. Even if another component is applied simultaneously, the change in signals due to the change in the normally applied forces should change linearly with the amplitude of the change in normal force. For the case of the tangential force applied to the tip as shown in FIG. 8, a tangential force as depicted will cause a compression in the transducer 14 and tension in the transducer 18. To resolve forces in three orthogonal directions (one normal and two tangential force components), an additional transducer 16 is required. A fourth transducer 20 is necessary if a fourth component, torsion about the axis normal to the base 24 through the distal point 28, is to be monitored. As mentioned earlier, because of the anisotropic effects of the film forming the transducers 14, 16, and 18, the transducers should be oriented radially toward the distal point 28 and positioned such that an angle of 70° is formed from the center of the transducer film to a line normal to the base 24 through the distal point 28. Preferably, the film forming the transducer is cut with a greater length than width, and such that the anisotropism causes the greatest change in output signal with strain to occur along the length of the transducer. The transducer 20 measures the torque about the line normal to the base 24 through the distal point 28, and the transducer film is preferably oriented so that the anisotropism of the transducer 20 is helical with the convex surface 26, as that is the direction of the torsional component.

To measure three force components, at least three strain transducers must be used. Similarly, the measurement of four components (three independent forces and a torque) requires at least four transducers. However, the transducers produce signals that are cross-axis sensitive. That is, the application of any force, whether it is normal or tangential, will produce signals from all of the transducers simultaneously. It is therefore necessary to decouple these signals into the individual components of the applied force and/or torque components. In performing the decoupling of the signals into the individual components, it is generally adequate to assume that the signals are linear functions of the strain experienced by the transducers. The sensor tip 10 may be calibrated by application of each force (or torque) in its pure form and measurement of the signal from each transducer. A proportionality constant is then derived for each transducer by dividing the amplitude of the signal from that transducer by the applied force. This may be expressed in the following equation: Measured signal $(s_i)=[\text{constant}(k_{ij})]\times[\text{Applied force}(f_j)]$ or $$k_{ij}=s_i/f_j,$$

where $k_{ij}$ is the proportionality constant found by dividing the amplitude of the signal from the transducer $(s_i)$ by the applied force $(f_j)$. After each force has been applied and the signals from each transducer are recorded for each force, a table of proportionality constants is created as shown in Table I.

TABLE I

| Force Applied | Transducer #1 | Transducer #2 | Transducer #3 | Transducer #4 |
|---|---|---|---|---|
| Normal | $k_{11}$ | $k_{12}$ | $k_{13}$ | $k_{14}$ |
| Tangential #1 | $k_{21}$ | $k_{22}$ | $k_{23}$ | $k_{24}$ |
| Tangential #2 | $k_{31}$ | $k_{32}$ | $k_{33}$ | $k_{34}$ |
| Torsional | $k_{41}$ | $k_{42}$ | $k_{43}$ | $k_{44}$ |

Since the signals are assumed to be linear for each degree of freedom, the results can be added together as follows:

$$s_1=k_{11}f_1+k_{12}f_2+k_{13}f_3,$$

$$s_2=k_{21}f_1+k_{22}f_2+k_{23}f_3,$$

$$s_3=k_{31}f_1+k_{32}f_2 k_{33}f_3, \text{ and}$$

$$s_4=k_{41}f_1+k_{42}f_2+k_{43}f_3+k_{44}f_4.$$

In matrix form, this will yield:

$$s=[k]f.$$

where s is the column matrix of signals from the four transducers, [k] is the matrix of constants, and f is the column matrix of applied forces. In order to decouple the forces into the three force components (normal and two tangential forces), the matrix equation is solved for f to obtain the following relation.

$$f=[k]^{-1}s.$$

The result is a measure of the three independent force components and the torque component as a function of the signals from each of the transducers 14, 16, 18 and 20.

The matrix of constants, [k], depends on where the transducers are positioned on the body. As might be expected, there will be small errors in the coefficient matrix, [k], that grow during the matrix manipulation used to determine f. Two methods may be used to reduce the error in the estimate of the force components. The first method is simply to use more accurate and precise methods both in taking measurements of the signals and in applying the pure force components, and in using statistics to improve the quality of the [k] matrix elements. The second method of reducing errors when decoupling involves the optimal positioning of the transducers on the sensor tip 10.

Figure 5:
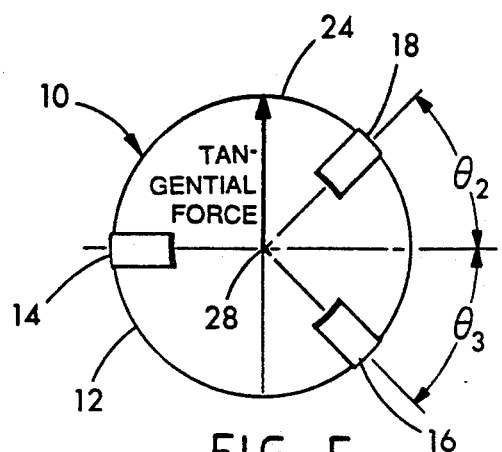
FIG. 5 is a simplified top view of the sensor tip, showing the possible locations of the piezoelectric polymer film force transducers about the circular base.

The optimal position of the transducers 14, 16, and 18 involves two constraints: 1) the columns of the [k] matrix should be orthogonal, and, 2) the columns of the [k] matrix should be of equal length. To determine the optimal position of the transducers 14, 16, 18, and 20 about the base 24, it is assumed that the signals produced by three of the four transducers (the transducers 14, 16, and 18) when a torque is applied can be controlled by strategic placement of the polymer film transducers. It is also assumed that the signal produced by the fourth sensor (20) will be small when normal or tangential forces are applied compared to the signal obtained when a torque is applied. As to the length of the columns, the optimization of equal column lengths is determined by the mechanical dimensions of the sensor tip 10 and therefore equal column lengths cannot be obtained simply by changing the relative position of the transducers 14, 16, and 18 around the base 24 of the sensor tip 10. However, the positions of the transducers about the base 24 of the sensor tip 10 can be manipulated to obtain an orthogonal [k] matrix. Two additional assumptions shall be made. First, when a tangential force is applied perpendicularly to a particular transducer (e.g., transducer 14 in FIG. 5), the signal will be assumed small as compared to the signal obtained when a tangential force is applied parallel to the transducer (e.g., transducer 16 when $\theta=90°$ in FIG. 5). Each piece of film constituting a transducer is cut to have substantially greater length than width, and it is understood that "parallel" to the transducer means parallel to its length. The anisotropic properties of the piezoelectric film are used advantageously by cutting the film for the transducer so that the transducer is most sensitive to strain along its length. Second, if the tangential force is applied in a direction between perpendicular and parallel to the transducer, it will be resolved in the output signal from the transducer primarily into its perpendicular component. The [k] matrix (excluding the effects due to torque) is given below in Table II:

TABLE II

|  | Normal-Z | Tangential-X | Tangential-Y |
|---|---|---|---|
| Transducer 14 | 1 | 1 | 0 |
| Transducer 18 | 1 | $-\cos \theta_2$ | $-\sin \theta_2$ |
| Transducer 16 | 1 | $-\cos \theta_3$ | $\sin \theta_3$ |

By solving the matrix to force the columns to be orthogonal gives:

$$\theta_2 = \theta_3 = 60°.$$

Although these are the optimal positions calculated, the preferred positions are such that $\theta_2 = 0°$ and $\theta_3 = 20°$ for three reasons. First, the strips of polymer film used as transducers fit on the sensor better at these positions. Second, the effects due to the force components are easier to visualize at these angles. Third, two of the three columns are perpendicular, which provides reasonably good reduction of error propagation.

Figure 9:
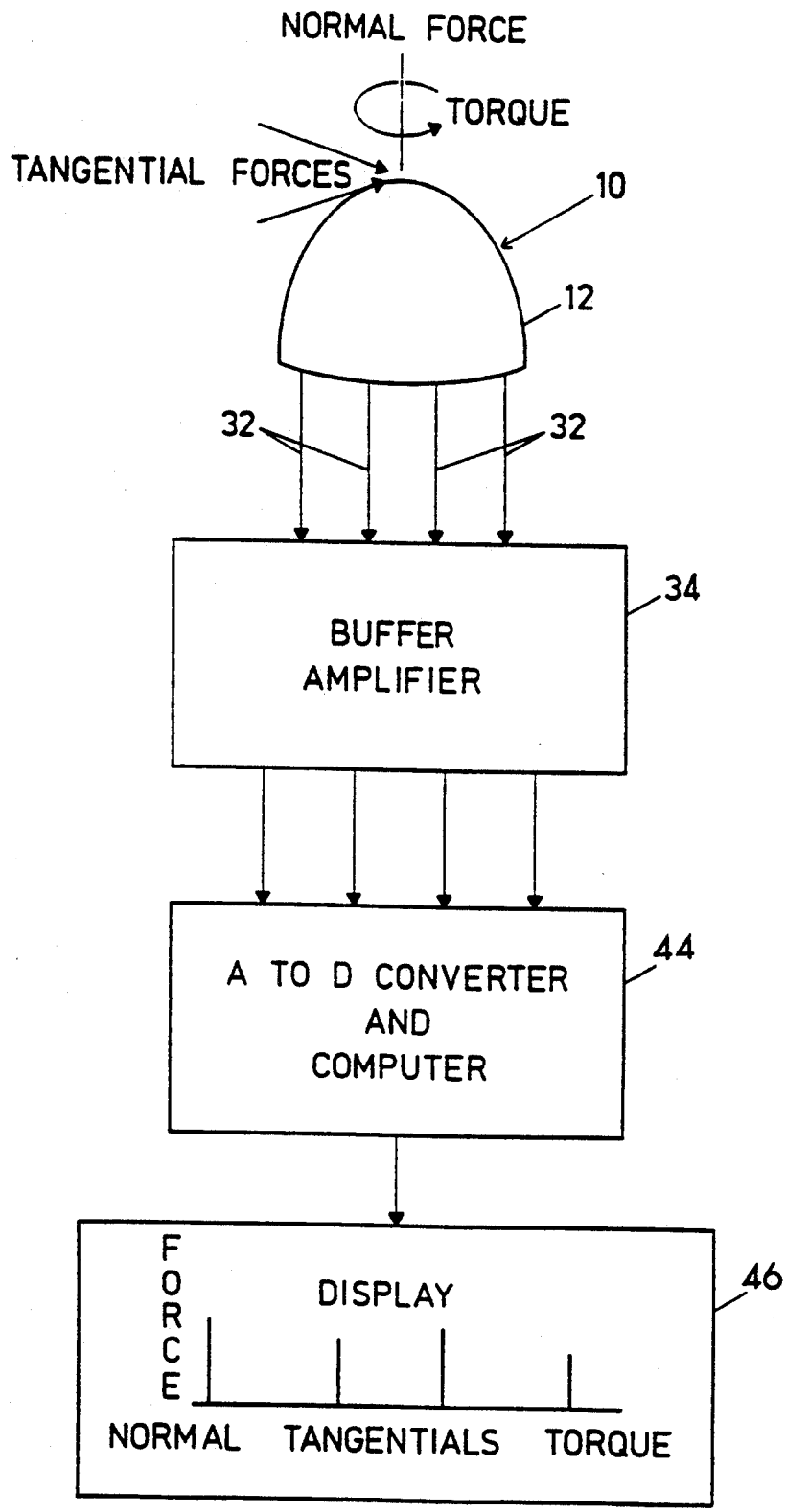
FIG. 9 is a schematic view of the system in accordance with the invention for conversion of strain in the elastomeric body, as sensed by the transducers, to the decoupled component forces and torque.

The four transducers 14, 16, 18, and 20 each have a pair of attached wire leads 32 that carry the signal representing the strain detected by each of the respective transducers. These leads 32 extend through the bottom of the base 24 and the support plate 31 and are connected to a signal amplification circuit 34, as shown in FIG. 9. The buffer amplifier circuit 34 buffers the signal from the transducers to provide a condition output signal which yields quasi-steady state force information without substantial signal drift and without compromising measurement sensitivity.

Figure 10:
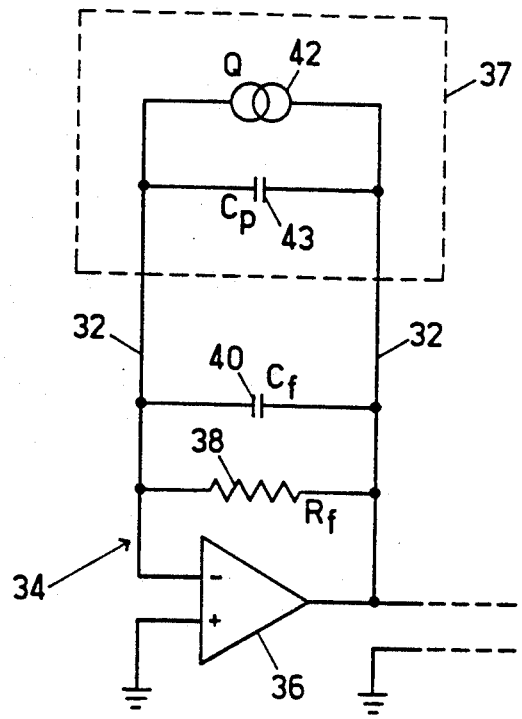
FIG. 10 is a schematic circuit diagram of the buffer amplifier circuit of the present invention.

FIG. 10 shows a greater detail of the preferred amplifying circuit 34 of the present invention, with one such circuit used for each transducer. The circuit 34 includes an operational amplifier 36, the piezoelectric polymer film of the transducer, with its equivalent circuit shown within the dashed lines labeled 37 in FIG. 10., a high resistance value resistor 38, and a capacitor 40, all connected in parallel in a feedback loop around the amplifier 36. The equivalent circuit 37 for the piezoelectric transducer includes a current (or charge) source 42 which generates a charge as a function of strain and a capacitor 43 which represents the capacitance of the piezoelectric polymer film. Four separate buffer amplifier circuits 34 are required, one for each of the transducers 14, 16, 18, and 20. In the present invention, the piezoelectric polymer film is not a charge transfer device, but rather a charge measuring device. The voltage across the effective capacitance $C_p$ of the polymer film will be proportional to the charge produced by the film, which in turn is proportional to strain. The output voltage from the amplifier 36 thus will be proportional to the strain in the film. This configuration, where the piezoelectric polymer film is connected in the feedback loop, has very desirable attributes for static charge buffering. The incorporation of the resistor 38 (of resistance $R_f$) provided in parallel with the transducer capacitor 43 (of capacitance $C_p$) further improves the long term stability attributes of the buffer circuit 34. The additional feedback capacitor 40 (of capacitance $C_f$) is provided to avoid the possibility of the voltage generated by the piezoelectric polymer film putting the operational amplifier 36 into saturation. In such a case, this capacitance $C_f$ plus the feedback capacitance provided by the capacitor 43 ($C_p$) lowers the available gain for the circuit.

The piezoelectric polymer film will generate a charge Q given a specific level of strain. The voltage $V_f$ across the piezoelectric polymer film on the lines 32 will be proportional to Q as $$V_f = Q/(C_p + C_f)$$

Without the feedback capacitance ($C_f$) of the capacitor 40, the charge Q is held in the capacitance $C_p$ of the piezoelectric polymer film represented at 43; with the feedback capacitor 40, the charge Q is shared between the capacitance $C_p$ of the polymer film and the capacitance $C_f$ of the capacitor 42, allowing the output voltage range to be selected to a desired level by proper selection of the capacitance $C_f$ of the capacitor 43. The time constant, $\tau$, therefore equals $R_f$ times $(C_p + C_f)$. Since the capacitance $C_p$ of the piezoelectric polymer film is a constant, the feedback capacitor 40 ($C_f$) should thus be as small as possible. To make the time constant, $\tau$, as long as possible, the feedback resistor 38 ($R_f$) should be as high as possible without sending the steady state output bias of the operational amplifier 36 into saturation. The value of the feedback resistor 38 ($R_f$) is chosen so as to dominate the input resistance of the amplifiers 36.

As used herein, "dominance" of the feedback resistance 38 ($R_f$) over the input resistance to the amplifier is obtained when the effective resistance is parallel with the transducer 37 is at least about 90% of the value of the feedback resistor 38 (i.e., the value of the feedback resistor is no more than about one ninth of the amplifier input resistance). In this manner, the length of the discharge pc time constant can be predetermined despite variability in the input resistance of the amplifier 36. The performance of the buffer amplifier circuit 34 is therefore limited by the high value resistor 38 ($R_f$) and the input bias current, $I_b$, of the operational amplifier 36. Selection of the particular operational amplifier 36 thus focuses on those with minimum input bias current. There are several suitable CMOS based operational amplifiers with input bias currents of one picoampere or less. These are commercially available as: AD515A Electrometer op amp from Analog Devices; 8515 from Analog Devices; TCL25 L2CP from Texas Instruments; 7611 and other 76xx from Intersil; and CA3130E from RCA. Such operational amplifiers are limited to supply rails of $\pm 5$ V or less, thus making the additional feedback capacitor 40 ($C_f$) necessary to keep the voltage in the feedback path below $\pm 4$ V. The added capacitance from the capacitor 40 ($C_f$) reduces the gain and maintains the output voltage between the supply rails. To achieve the necessary time constants, the feedback resistor 38 ($R_f$) should typically be on the order of $10^{11}$ to $10^{12}$ ohms. Surface mount resistors having such high resistance values are commercially available from Eltec Instruments Inc. of Daytona Beach, Fla. The buffer amplifier circuit 34 is preferably built around a 14 pin DIP quad CMOS amplifier, therefore making it possible to integrate four buffer amplifier circuits 34, one for each of the transducers 14, 16, 18, and 20, and to locate the circuits in a surface mount device directly beneath the sensor tip 10 at its base 24. The surface mount device may suitably be packaged in a cylinder 1 inch in diameter, 0.5 inches in height, and bonded directly to the base 24 of the sensor tip 10. The base of the surface mount device may then be clamped to the robot end effector using a 1 inch diameter band clamp with a "C" section.

The output signal of the operational amplifier 36 is a low impedance signal which is noise immune and readily transferred to computers and other instrumentation or processing devices. The amplified signals may then be provided to an analog to digital converter and computer 44 where the signals are digitized and the digital data analyzed to determine the component forces in accordance with the equations given above. Alternatively, the signal manipulation required to resolve the signals from the transducers into signals representing the four components can be incorporated into a hard wired analog circuit. A display device 46, such as a video monitor, may be controlled by the computer to show the individual components to an operator, or the data on these components may be used by the computer to control the operation of a robot gripper which has the tactile sensor tips of the invention.

Figure 11:
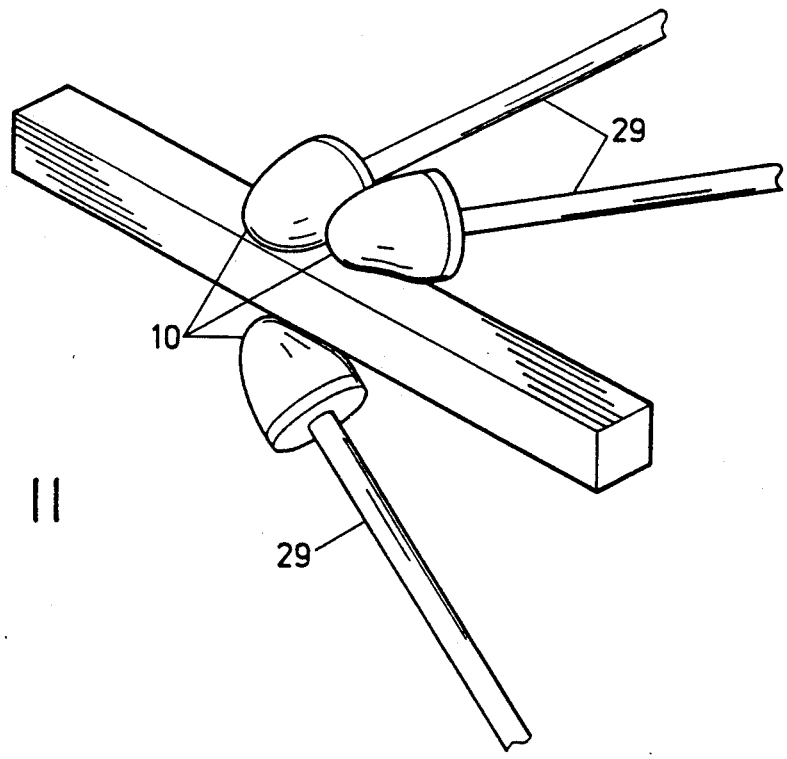
FIG. 11 is an illustrative partial view of a three-point grasp upon an object by a robotic gripper hand having three fingers, each of the fingers having a sensor tip.

Although the sensor tip 10 may be positioned on the end of one finger that forms an extremity to a robotic hand, gripper, probe, or the like, the sensor tip 10 is ideally suited for use with other, similar sensor tips 10 on a robotic hand having multiple fingers. Though most of the prior art robot grippers utilize tactile sensors that can sense in one degree of freedom, i.e., can only detect a normal force upon an object as detected on a two-dimensional array, the use of the sensor tip 10 in a multiple finger robotic hand better emulates the human hand in sensing an object. In many grasping tasks, the human hand will establish three primary points of contact (the end of the thumb and the end of the first and second fingers) with the object to be grasped. In a robotic hand having three fingers and three sensor tips 10 at the end of the fingers, as shown in FIG. 11, an object may be picked up between three points of contact, each of which may relay feedback information to the robot controller. The use of three points of contact in robotic grasping, rather than merely two points of contact using only a normal force, provides a more stable grasp. If a significant torsional component applied to the sensor tips is sensed by the robot controller, the robot will be alerted that the object has not been grasped near its center of gravity. The robot can then put the object down and make adjustments to its grip with the object. If significant tangential force components are sensed by the robot, the robot can be alerted that the object is heavy and may slip from its grasp and it can adjust its grip accordingly so that it will not drop the object.

The performance of the sensor tip 10 under experimental conditions has demonstrated that sensor tips in accordance with the invention have good linearity, minimal hysteresis, good repeatability and range, and minimal interactions between the force components. Linearity of the sensor tip 10 means that the output signals of the transducers are linear for any reasonable magnitude of force which is applied. Without linearity, the above-described equations for decoupling the components may not be accurate.

Figure 13A:
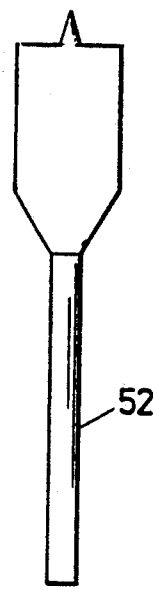
FIG. 13A is an exemplary drill bit that may be modified for use in the manufacture of a sensor tip.
Figure 13B:
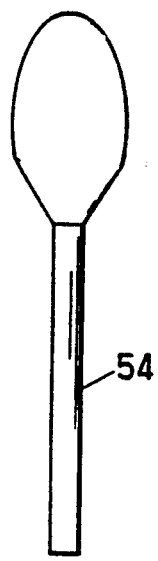
FIG. 13B is the drill bit of FIG. 13A after modification.
Figure 12:
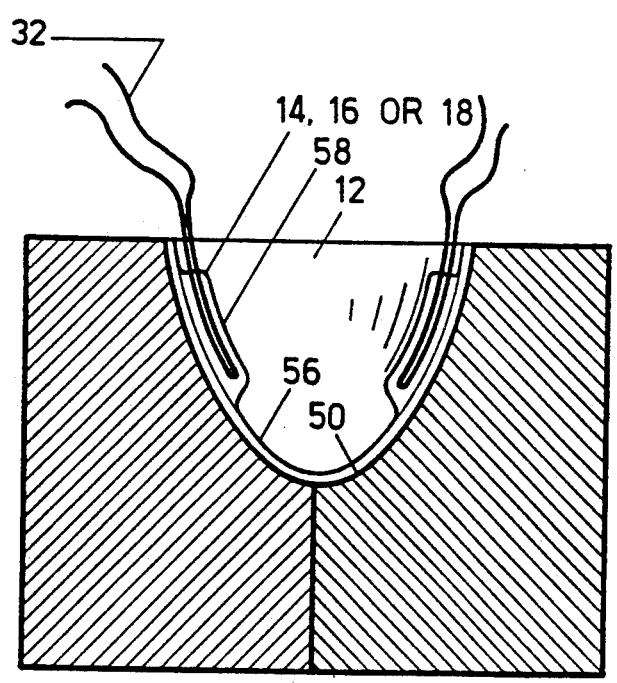
FIG. 12 is a cross-sectional view of a mold cavity which can be used in the manufacture of the sensor tip.

A procedure for the manufacture of the sensor tip 10 is described below with respect to FIG. 12, which shows a cross-section of a mold cavity 50 for the sensor tip 10. The mold cavity 50 is formed by first creating a profile of the elastomeric body 12 of the sensor tip 10. A standard drill bit 52, shown in FIG. 13A, such as used for drilling holes in wood or other soft materials and which is available in hardware stores, is modified so that the profile of the elastomeric body 12 is ground onto the drill bit 52. After a coarse outline has been ground onto the bit it is inserted into a drill press. Turning the spade bit at 200 RPM or less while grinding the profile with a high speed grinder allows for fine adjustment of the profile while simultaneously insuring perfect symmetry of the drill bit about the center of rotation. After the profile is finished, the bit may be sharpened using a hand file. Only the trailing edge of the spade bit is removed during sharpening of the bit to retain the profile while providing the necessary cutting edge relief. The resulting spade bit, shown as 54 in FIG. 13B, has a zero degree rake, which works well for cutting of plastics. Once the spade bit has been modified, creation of the mold cavity 50 is accomplished by using the bit 54 to drill the profile of the cavity into the mold material. PVC (polyvinyl-chloride) is a preferred material for the mold material in that it has low adhesion to the RTV silicone rubber and requires no mold release agent. For ease of removal of the elastomeric body 12, the mold cavity 50 is a split mold. The split mold is preferably created with multiple cavities or profiles to allow for the creation of multiple sensor tips 10 with each molding process.

The RTV silicone rubber, in liquid form, tends to sheet in uniform layers of approximately 0.020 inches in thickness. Beginning with a small amount of the liquid RTV silicone in each of the mold cavities 50, the molds are turned at various angles to form a coating 56 of liquid RTV until the inner surface of all cavities is coated with the liquid RTV. The mold is then set aside and the RTV silicone is allowed to cure. The RTV cures with a small pool in the center of the mold cavity 50 and a thin, uniform film around the inner surface of the mold cavity 50. The coating of the mold cavity 50 with a sheet of RTV silicone prior to placement of the transducers 14, 16, 18, and 20, discussed below, results in a submerging of the transducers beneath the outer boundary 22. This allows a reliable bonding of the piezoelectric polymer film to the sensor tip 10, and provides inner structural bonds that prevent the sensor tip 10 from delaminating during subsequent use.

The piezoelectric polymer film is cut to proper size, with care taken to cut the film with the proper anisotropic orientation along the length of the film. The wire leads 32 are attached to the film by a conductive epoxy (such as Tra-Duct 2902, which is commercially available from Tra-Con Inc. of Medford, Mass.), with only a minimal amount of epoxy used so as not to interfere with the mechanical properties of the elastomeric body 12 or the polymer film of the respective transducer. Wire leads 32 that are 0.009 inches in diameter and of solid wire-wrap construction are suitable because only small amounts of conductive epoxy are needed to attach the wire leads 32 to the respective transducer. Where the specified wire leads are used in combination with PVDF film having a silver ink surface, the surface area of the transducer film coated with epoxy is typically less than 5%. The use of a conductive epoxy in attachment of the wire leads 32 to the film introduces the risk of shorting the opposite surfaces of the film with a small amount of adhesive on the edge. This mode of failure can be revealed by use of an ohmmeter to measure the resistance of the transducer, or, alternately to measure the capacitance of the transducer. A second test of the transducers after attachment of the wire leads 32 involves a light tug on the leads 32 themselves. Inasmuch as the pot life of the epoxy is less than an hour, connections made near the end of the pot life of the epoxy have a higher rate of failure. The pull test of the wire leads 32 after the adhesive has cured allows identification and rejection of transducers that might have otherwise failed after being incorporated into a sensor tip 10. After the wire leads 32 have been attached to the film and have passed the aforementioned tests, the film is dipped in air cured silicone rubber adhesive to form a coating 58 upon each of the transducers 14, 16, 18, and 20. The transducers 14, 16, 18, and 20 are then positioned in their desired locations within the mold cavity 50. The resultant coating 58 upon the transducers of air cured silicone rubber, a viscous material, acts as a primer and holds the transducers in position without sagging until the silicone adhesive cures.

Once the transducers 14, 16, 18, and 20 are in position and the silicone adhesive cures, the mold cavity 50 can be filled with liquid RTV. The silicone rubber is a liquid rubber base. The silicone rubber adhesive that forms the coating 58 does not necessarily have to be the same material as the silicone rubber that fills the remainder of the mold cavity 50. To prevent air from being trapped in the liquid during the stirring, which could create voids that affect the mechanical properties of the elastomeric body 12, the liquid is preferably "de-aerated" by placing the liquid into a vacuum bell and decreasing the pressure. Under low pressure, the rubber becomes frothy as the air bubbles expand and burst. For less critical applications under atomspheric conditions, the vacuum degassing step may be eliminated from the process in that it has been found that, in general, little entrapped air has been detected within the sensor tip 10, especially where a fine wire has been used t o bring trapped air bubbles to the surface before the RTV silicone rubber has cured. Where sensor tips 10 are intended for use in extreme pressure situations, e.g. undersea and in space, however, the degassing step is critical in that distortion and possible permanent damage could result to the sensor tips 10 in those environments. When 10% catalyst, e.g. Dow Corning Catalyst "S" is added to the base material, curing time is approximately 8-10 hours. When the RTV silicone rubber is cured, the mold cavity 50 can be split and the sensor tip 10 removed. Because of the simple manufacturing process and the low cost of materials, the sensor tip 10 may be considered consumable in some applications and easily replaced.

To obtain alternate physical, thermal, or electrical properties in the sensor tip 10, the mold cavity 50 may be filled in gradations of layers of varying silicone rubber materials. The different properties of the sensor tip 10 may be necessary for different robotic applications of the sensor tip 10.

Subsequent to the manufacture of the sensor tip 10, it is necessary to test and calibrate the sensor tip. Testing a sensor tip requires the ability to deliver known levels of force accurately to generate the output data necessary to calculate the constants used in the decoupling algorithm. Thus, a force delivery system adequate for calibration must be able to deliver pure forces while simultaneously recording the outputs of the sensor tip 10.

Figure 14:
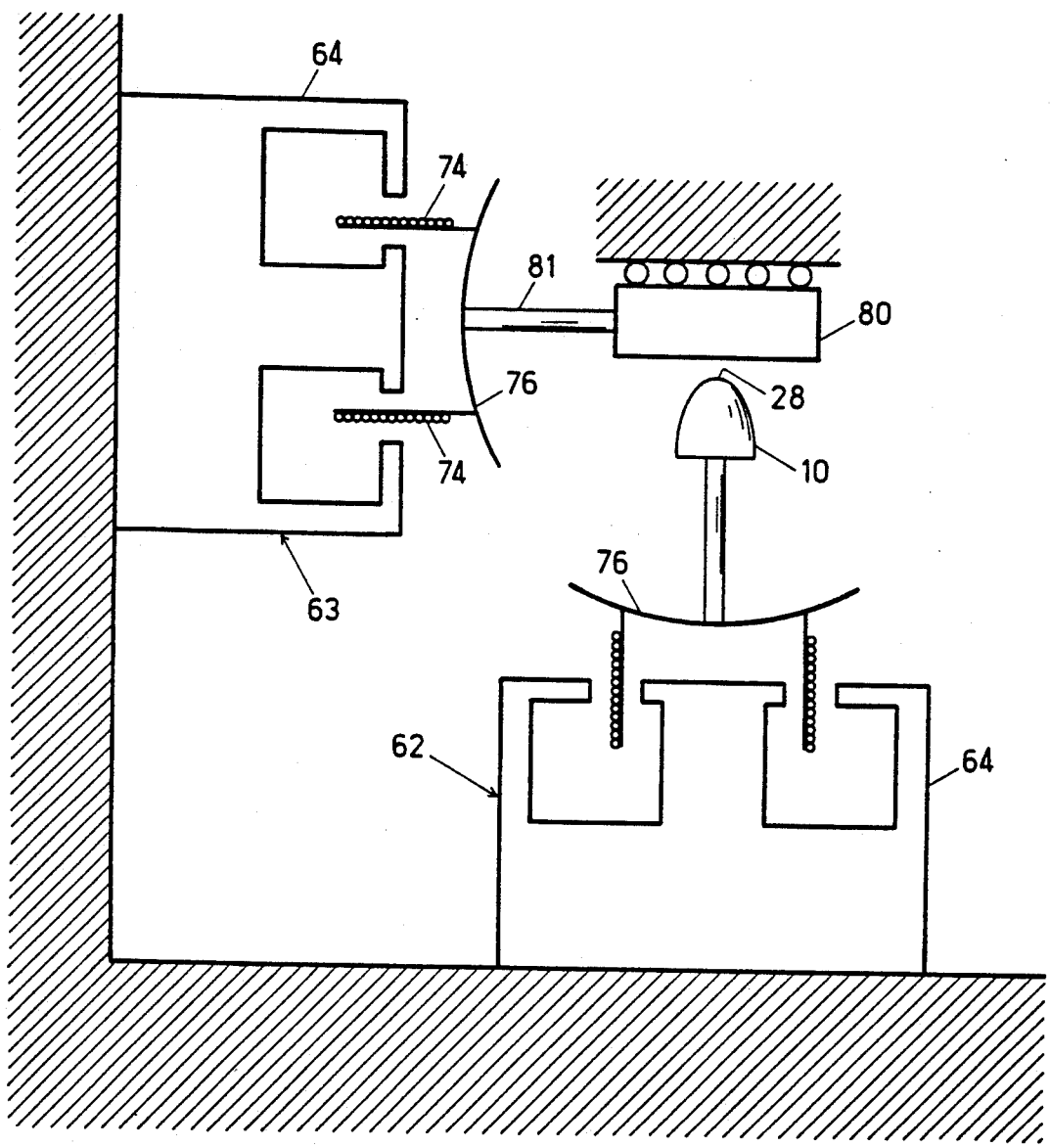
FIG. 14 is a schematic view of two components of the four component force delivery system of the present invention.
Figure 15:
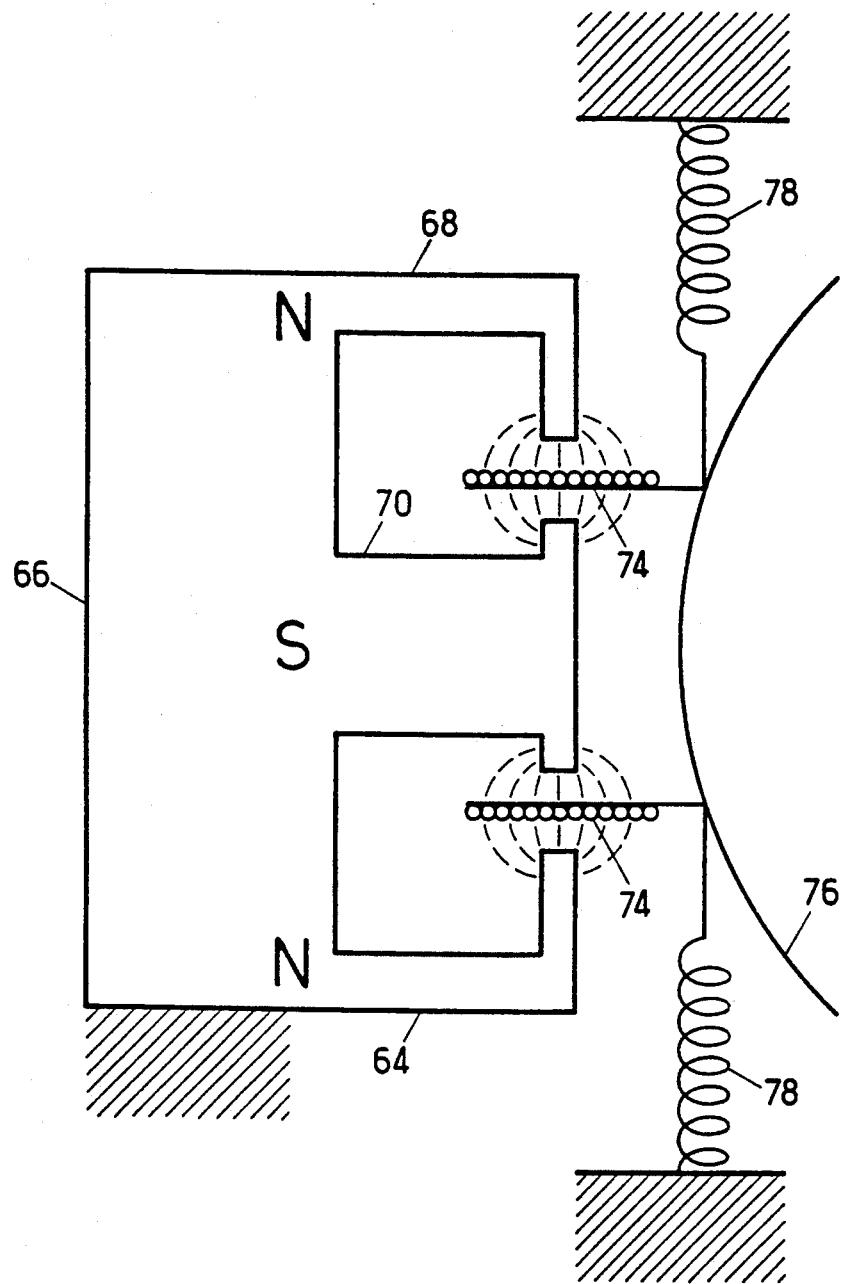
FIG. 15 is a somewhat simplified cross sectional view of one of the voice coil drivers of the present invention.
Figure 16:
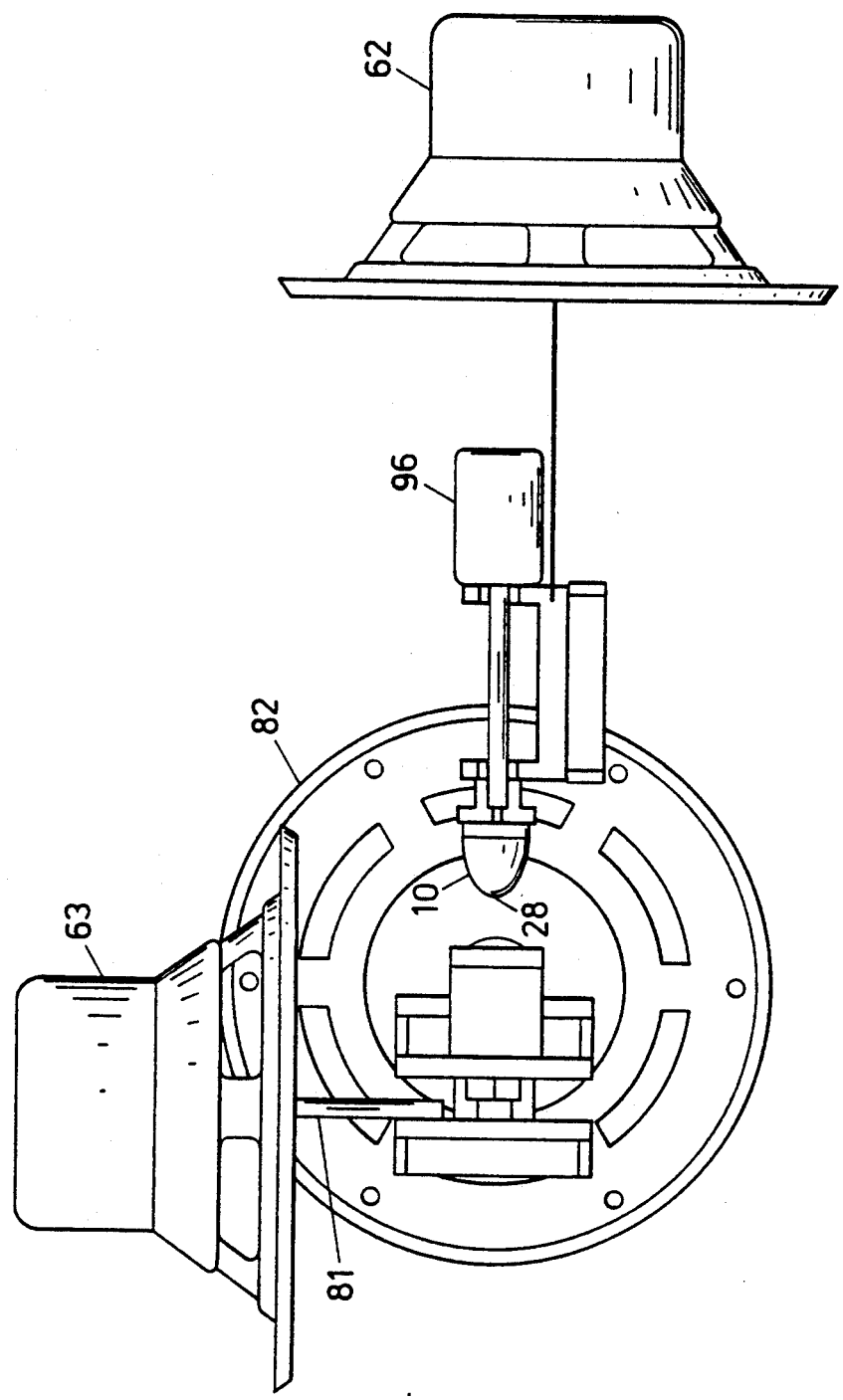
FIG. 16 is a side semi-schematic view showing the arrangement of the four components of the force delivery system of the present invention, including voice coils that deliver a normal and two tangential forces, and a torque driver.

The force delivery system 60 is shown in FIGS. 14, 15, and 16. FIG. 14 shows a schematic drawing of a z-axis voice coil driver 62 and an x-axis voice c oil driver 63 to deliver normal ($F_N$) and tangential forces ($F_T$), respectively. The preferred architecture for each of the drivers for force delivery in the calibration system of the invention is that of a constant reluctance linear permanent magnet (PM) motor. The small range of movement needed allows a single coil rotor to be used in a permanent magnetic field. As shown in FIG. 15, each of the drivers 62 and 63 (which may be commercially available voice coil units) comprises an "E" cross section permanent magnet 64 having a base 66, an outer member 68 and a core member 70. The permanent magnet 64 has an orientation such that the core forms one pole, and the outer member forms the opposite pole. In FIG. 15, the core is "S" and the outer member is "N." A voice coil 74 is positioned in the gap between the core and outer member 68 and 70. A platform 76 (which may be part of the speaker core) is suspended from structural supports by spring-like hangers 78 and the platform 76 is attached to the voice coils 74.

Movement of the platform 76 is induced by the introduction of a current to the voice coils 74 of a particular driver 62 or 63. The voice coil 74 acts as a rotor and the "E" section permanent magnet 64 acts as a stator. As shown in FIG. 14, the z-axis driver 62 delivers a normal force to the sensor tip 10 being tested that is mounted upon an arm. The x-axis driver 63 delivers a tangential force by movement of a linear slide 80 across the distal point 28 of the sensor tip 10. The linear slide 80 is attached to the platform 76 of the driver 63 by an arm 81. Such normal and tangential forces upon the sensor tip 10 are shown in FIGS. 7 and 8, and discussed above. In application of the normal force, the driver 62 moves the sensor tip 10 against the linear slide 80. In application of the tangential force, the sensor tip 10 is held stationary by the driver 62 as the driver 63 moves the linear slide across the distal point 28. The use of voice coil drivers affords a linear relationship between current introduced to the coils 74 and force experienced by the sensor tip 10. To produce a force linear with current, the cross product of current path length and the magnetic field density of the magnet 64 must remain constant. This can be accomplished with a short current path and a large field or with a long current path and a small area for the field. In either of these configurations, the voice coil can move either forward or backward in the field while the force remains proportional to the current. The net effect is a constant gain in units of force/current. The voice coils must, however, remain within the field of the magnets 64 upon movement to maintain a linear relationship between current and force. The low weight of the rotor—the voice coil 74—allows for a fast response of the calibration force delivery system 60.

The depiction of FIG. 14 shows the normal force ($F_N$) voice coil driver 62 and one of the two tangential ($F_T$) force voice coil drivers 63. FIG. 16 is a semi-schematic drawing showing the drivers 62 and 63 which exert forces in the z-space and x-axis direction, respectively. A third drive 82 is positioned to exert a tangential force in the y-direction which is perpendicular to forces applied by each of the drivers 62 and 63. The driver 82 is constructed similarly to the driver represented in FIG. 15.

Figure 17:
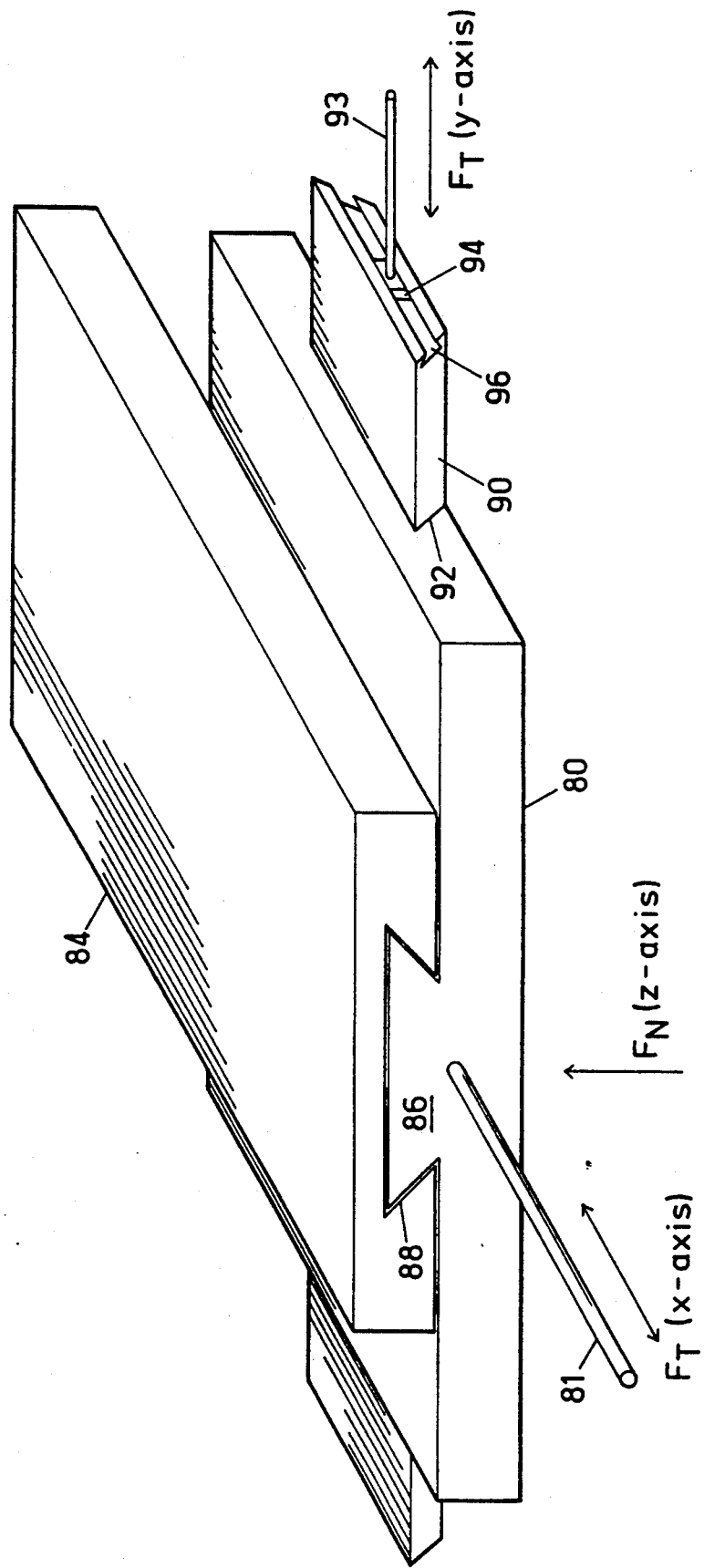
FIG. 17 is a semi-schematic view showing an exemplary linear slide arrangement to enable application of forces in the x- and y- axes.

To be able to apply tangential x-axis and y-axis forces, a linear slide arrangement such as depicted schematically in FIG. 17 is necessary. The linear slide 80 that is attached to the x-axis driver 63 is mounted to slide against a fixed member 84. The linear slide 80 has a protrusion 86 that dovetails within an indentation 88 of the fixed member, the protrusion 86 and the indentation 88 acting to maintain sliding engagement of the linear slide 80 against the fixed member 84, so that the arm 81 moves in a straight line perpendicular to the movement of the driver 62 (herein referred to as the x-axis). A second linear slide 90 dovetails within an identation 92 of the first linear slide 80 and is attached to the y-axis driver 82. The linear slide 90 is attached to the platform 76 of the driver 82 by an arm 93. The linear slide 90 maintains sliding engagement of the linear slide 90 against the linear slide 80, so that the arm 93 moves in a straight line perpendicular to the movement of the driver 62 and the arm 81 of the driver 63 (herein referred to as the y-axis). The end of the arm 93 that attaches to the linear slide 90 terminates in a block 94 that is shaped to fit within a channel 96 in the end of the linear slide 90. Thus, upon movement of the linear slide arrangement and particularly the linear slide 80 along the x-axis, movement of the linear slide 90 is unconstrained by the arm 92. The linear slide arrangement as depicted in FIG. 17 thus allows unconstrained movement along the x-axis and y-axis to apply tangential forces to a sensor tip 10 that is positioned with its distal point 28 against the linear slide 80. To apply a pure normal force to the distal point 28 of the sensor tip 10, the driver 62 (not shown in FIG. 17) moves the sensor tip 62 in the z-axis against the linear slide 80.

To test and measure torque applied to the sensor tip 10, a torque driver 96 is used, as illustrated in FIG. 16. The torque driver 96 includes a miniature basket wound dc motor having a low mass rotor and ball bearings. In the application of torque to the sensor tip 10, the torque driver 96 rotates the sensor tip 10 against the linear slide 80.

It is understood that the invention is not confined to the particular embodiments herein illustrated and described, but embraces such modified forms thereof as come within the scope of the following claims.

What is claimed is:

1. An apparatus for calibrating a sensor tip used in a robotic hand which is capable of manipulating an object, the sensor tip having an elastomeric body with a three-dimensional outer boundary that contacts the object being manipulated and at least one transducer that produces an electrical signal indicative of strain on the body resulting from manipulation of the object, the apparatus comprising:
   (a) a magnet that produces a magnetic field;
   (b) a coil supported for a small range of movement within the magnetic field that is induced to move upon introduction of a current to the coil;
   (c) means for mounting the sensor tip to the coil so that the sensor tip is directed against a surface such that the force applied to the sensor tip is linearly related to the current applied to the coil;
   (d) means for measuring the signal produced by the transducer to allow a proportionally constant that relates the amplitude of the signal given by the transducer to the applied force to be determined, and
   (e) means for rotating the sensor tip against the surface.

2. The apparatus of claim 1 wherein the means for rotating is a dc motor.

3. An apparatus for calibrating a sensor tip used in a robotic hand which is capable of manipulating an object, the sensor tip having an elastomeric body with a three-dimensional outer boundary that contacts the object being manipulated and at least one transducer that produces an electrical signal indicative of strain on the body resulting from manipulation of the object, the apparatus comprising:
   (a) a magnet that produces a magnetic field;
   (b) a first coil supported for a small range of movement within the magnetic field that is induced to move upon introduction of a current to the coil;
   (c) means for mounting the sensor tip in a selected position and means for mounting a member having a surface to the first coil so that the surface is directed to move against the sensor tip such that the force applied to the sensor tip is linearly related to the current applied to the first coil;
   (d) means for measuring the signal produced by the transducer to allow a proportionality constant that relates the amplitude of the signal given by the transducer to the applied force to be determined;
   (e) a second magnet that produces a second magnetic field; and
   (f) a second coil supported for a small range of movement within the second magnetic field that is induced to move upon introduction of a current to the second coil, wherein the surface of the member may be directed to move in two different perpendicular directions, the member mounted to the second coil such that the second coil directs the surface to move against the sensor tip in a direction perpendicular to the direction of movement of the surface directed by the first coil.

4. The apparatus of claim 3 wherein the member having a surface is a linear slide arrangement capable of movement in two perpendicular directions.

5. The apparatus of claim 3 wherein the forces applied to the sensor tip are both tangential to the surface of the elastomeric body.

6. An apparatus for calibrating a sensor tip used in a robotic hand which is capable of manipulating an object, the sensor tip having an elastomeric body with a three-dimensional outer boundary that contacts the object being manipulated and at least one transducer that produces an electrical signal indicative of strain on the body resulting from manipulation of the object, the apparatus comprising:
   (a) a magnet that produces a magnetic field;
   (b) a first coil supported for a small range of movement within the magnetic field that is induced to move upon introduction of a current to the coil;
   (c) means for mounting the sensor tip in a selected position and means for mounting a member having a surface to the first coil so that the surface is directed to move against the sensor tip such that the force applied to the sensor tip is linearly related to the current applied to the first coil;
   (d) means for measuring the signal produced by the transducer to allow a proportionality constant that relates the amplitude of the signal given by the transducer to the applied force to be determined;
   (e) a magnet that produces a second magnetic field;
   (f) a second coil supported for a small range of movement within the second magnetic field that is induced to move upon introduction of a current in the second coil, wherein the means for mounting the sensor tip is moved to engage the sensor tip against the surface by the movement of the second coil.

7. An apparatus for calibrating a sensor tip used in a robotic hand which is capable of manipulating an object, the sensor tip having an elastomeric body with a three-dimensional outer boundary that contacts the object being manipulated and at least one transducer that produces an electrical signal indicative of strain on the body resulting from manipulation of the object, the apparatus comprising:
   (a) a magnet that produces a magnetic field;

(b) a first coil supported for a small range of movement within the magnetic field that is induced to move upon introduction of a current to the coil;

(c) means for mounting the sensor tip in a selected position and means for mounting a member having a surface to the first coil so that the surface is directed to move against the sensor tip such that the force applied to the sensor tip is linearly related to the current applied to the first coil;

(d) means for measuring the signal produced by the transducer to allow a proportionality constant that relates the amplitude of the signal given by the transducer to the applied force to be determined;

(e) means for rotating the sensor tip against the surface.

8. The apparatus of claim 7 wherein the means for rotating is a dc motor.

* * * * *

UNITED STATES PATENT AND TRADEMARK OFFICE
CERTIFICATE OF CORRECTION

PATENT NO. : 5,261,266
DATED : November 16, 1993
INVENTOR(S) : Lorenz, et al

It is certified that error appears in the above-identified patent and that said Letters Patent is hereby corrected as shown below:

In column 4, line 42, "Preferably" should be --preferably.

In column 7, line 61, "$s_3=K_{31}f_1+K_{32}f_2K_{33}f_3$, and" should be --$s_3=K_{31}f_1+K_{32}f_2+K_{33}f_3$, and--.

In column 9, line 14, "20°" should be --90°--.

In column 9, line 68, "$V_f$across" should be --$V_f$ across--.

In column 13, line 28, "t o" should be --to--.

In column 13, line 60, "c oil" should be --coil--.

In column 15, line 49, "proportionally" should be --proportionality--.

Signed and Sealed this

Seventh Day of June, 1994

Attest:

BRUCE LEHMAN

Attesting Officer                Commissioner of Patents and Trademarks